April 16, 1957
L. F. GILLUM
2,788,711
REARVIEW MIRROR
Filed Sept. 14, 1954
2 Sheets-Sheet 1
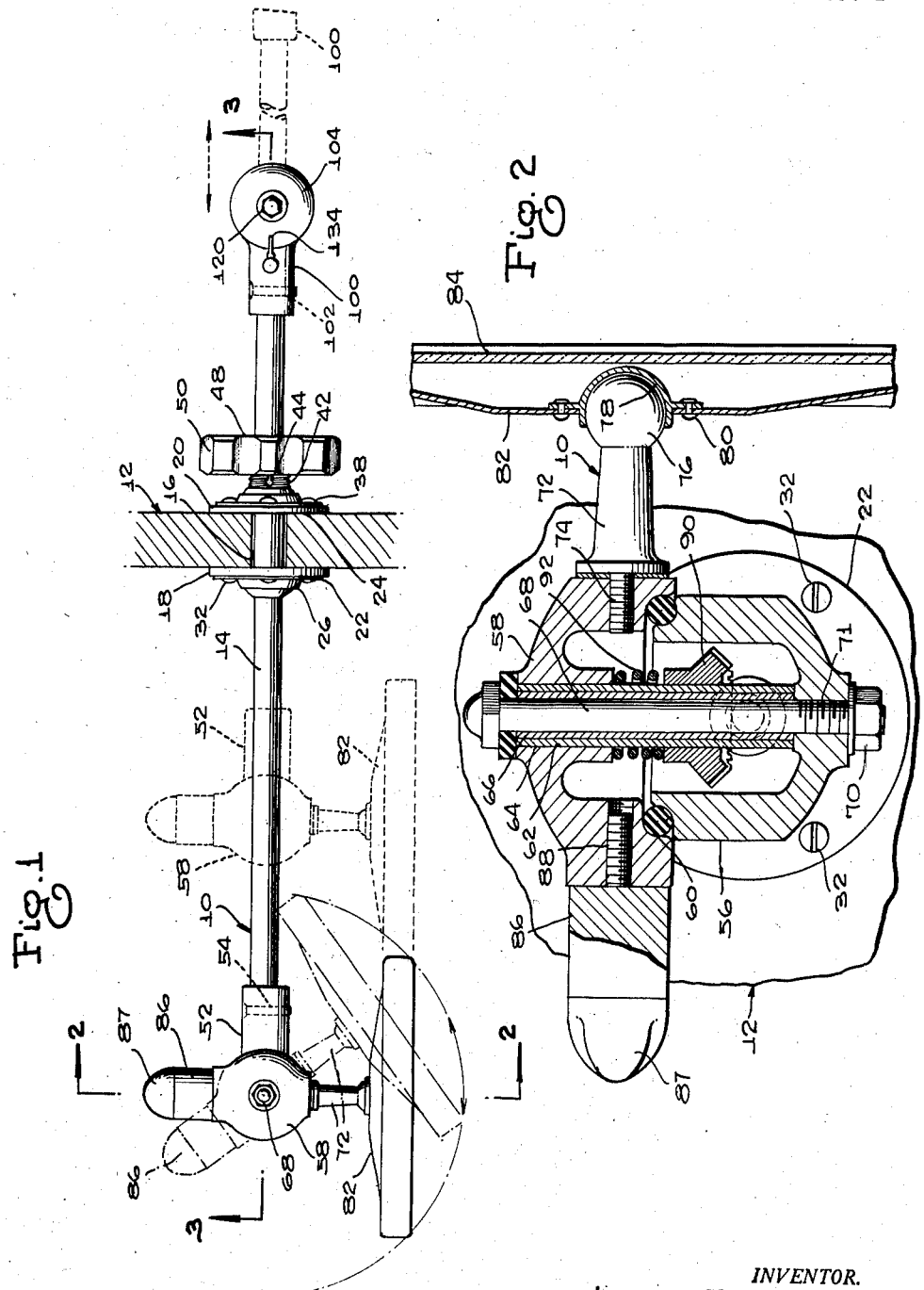
INVENTOR.
LLOYD F. GILLUM
BY
McMorrow, Berman & Davidson
ATTORNEYS

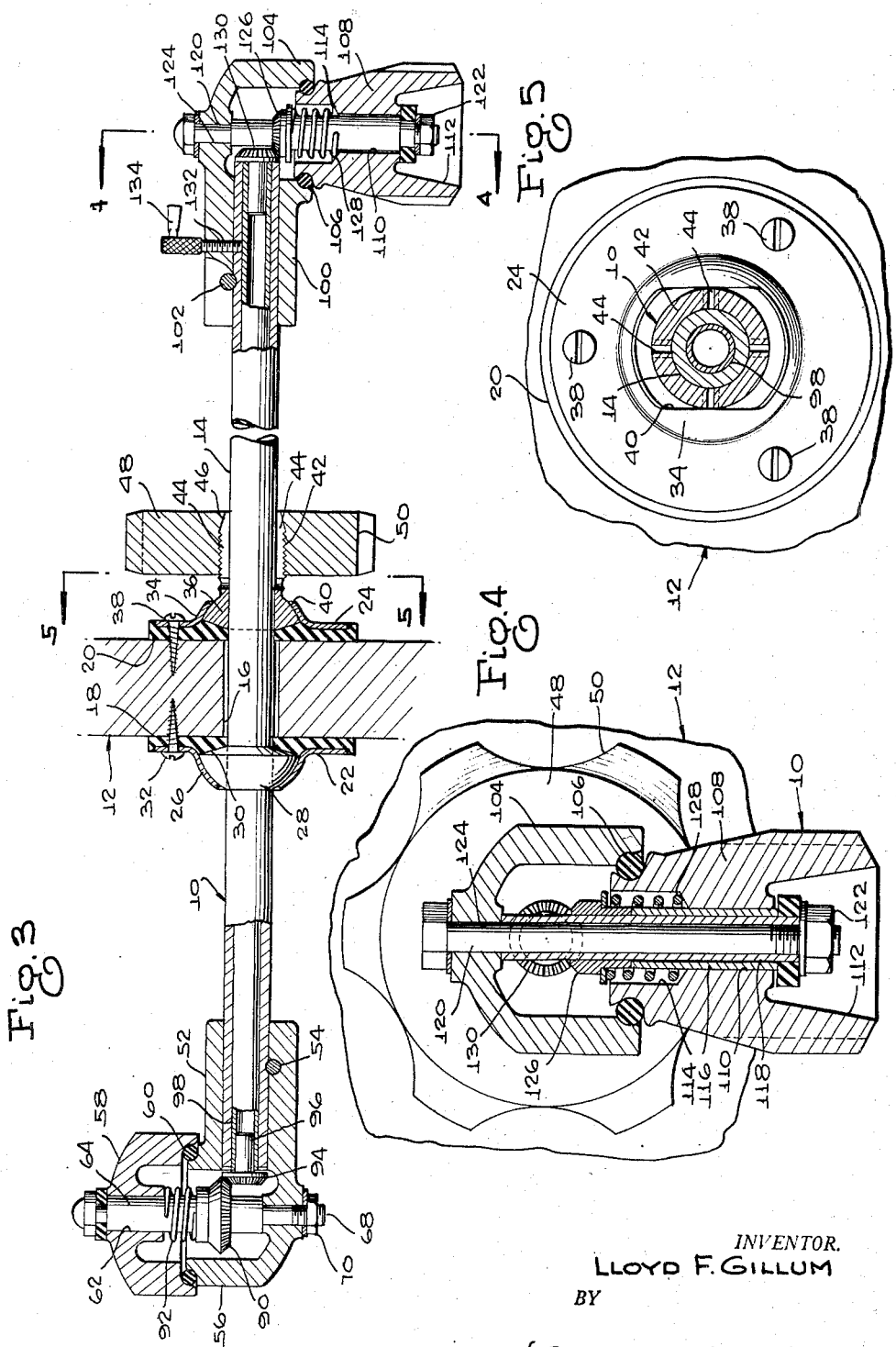

United States Patent Office 2,788,711
Patented Apr. 16, 1957

2,788,711

REARVIEW MIRROR

Lloyd F. Gillum, Cayuga, N. Y., assignor of one-half to Norman E. Gillum, Charleston, W. Va.

Application September 14, 1954, Serial No. 455,952

2 Claims. (Cl. 88—93)

This invention relates to rear view mirrors, and more particularly to that type of rear view mirror mounted upon a vehicle exterior at one or both sides thereof. While the mirror is used to particular advantage on large trucks, it is equally well adapted for mounting upon passenger cars, small trucks, and other vehicles.

Among important objects of the present invention are the following:

To permit the mirror element to be adjusted wholly from within the vehicle to a particular, selected plane;

To minimize distortion of reflections caused by vibrations transmitted from the vehicle to the mirror device;

To permit bodily adjustment of the mirror element either inboard or outboard of the vehicle, thus to allow retraction when, for example, the vehicle is parked and the mirror in its outboard position might be struck by a passing vehicle;

To counterbalance the adjustably movable portions of the device, thus to facilitate the making of a selected adjustment;

To permit a single form of the device to be mounted on any of various vehicles differing from one another in respect to type, size, or shape;

To permit the locking of the device in any selected position of adjustment; and

To provide a rear view mirror which will be simple in design, durable in construction, economical to manufacture, weather resistant, and of attractive appearance.

Other objects will appear from the following description, the claims appended thereto, and from the annexed drawing, in which like reference characters designate like parts throughout the several views, and wherein:

Figure 1 is a top plan view of the rear view mirror in which the dash-dotted and the chain-dotted outlines show the mirror element in different positions of adjustment;

Figure 2 is an enlarged sectional view on line 2—2 of Figure 1;

Figure 3 is an enlarged longitudinal sectional view through the device substantially on line 3—3 of Figure 1;

Figure 4 is a transverse sectional view through the control knob assembly, the scale being still further enlarged, substantially on line 4—4 of Figure 3; and Figure 5 is a transverse sectional view through the device, the scale being enlarged above that of Figure 3, showing the mounting of the device on the vehicle, substantially on line 5—5 of Figure 3.

The rear view mirror 10 constituting the present invention has been shown mounted upon the wall 12 of a vehicle such as the tractor of a tractor-trailer rig. The mirror has its outer end portion projecting laterally from the wall 12 outwardly from the vehicle, while the inner end portion of the device projects inwardly of the vehicle, to permit control of the positioning of the mirror element by the vehicle operator.

The rear view mirror 10 includes an elongated, cylindrical, open-ended, tubular housing 14 straight from end to end, having its intermediate portion rotatably mounted in a transverse through opening 16 formed in the vehicle wall 12.

Flat mounting discs 18, 20 of soft rubber, having center openings registering with the opening 16 and receiving housing 14, are mounted against the outer and inner surfaces of the vehicle wall. Circular plates 22, of non-corrosive sheet metal or the like, are engaged against the outer surfaces of the discs 18, 20 respectively, and as shown in Figure 3, plate 22 has a centrally disposed, outwardly bulged ball socket 26 formed as a segment of a sphere and having a center opening receiving tubular housing 14. A ball formation 28, complementing the socket 26 and rotatable within said socket, is rigidly secured to the tubular housing, and is engaged in a shallow, annular, flared recess 30 formed in the center portion of the disc 18. Screws 32 are spaced equidistantly, circumferentially of the plate 22, and extend through registering openings formed in the plate 22 and disc 18, into the vehicle wall.

Plate 24 is formed with a socket 34 similar to the socket 26, and rotatably engaged in the socket 34 is a ball formation 36. Circumferentially spaced screws 38, extending through plate 24 and disc 20, are threaded into the inner surface of the vehicle wall, to secure the inner plate and disc against said wall.

As shown in Figure 5, the ball socket 34 has an opening 40, the opposite sides of which may be straight, with the upper and lower ends of the opening being oppositely curved.

Referring to Figures 1, 3, and 5, integrally formed upon a ball formation 36, that is fixedly engaged with the tubular housing 14, is a sleeve 42. Sleeve 42 is extended inwardly of the vehicle, surrounding the tubular housing, and is formed with longitudinal slots 44 spaced 90° apart circumferentially of the sleeve. The slots 44 at their inner ends terminate at the ball formation 36, and at their outer ends are open upon the outer end of the sleeve. At the outer end of the sleeve, there is formed a tapered portion 46 constituting a wedge. The sleeve is externally threaded, and threaded thereupon is a locking wheel 48, the periphery of which is preferably fluted at 50 (Figure 4). Wheel 48, at one end of its threaded inner opening, has a tapered portion complementing the taper of the sleeve, and thus, when the wheel 48 is threaded toward the left in Figure 3, it radially contracts the segments of the sleeve defined between the slots, into gripping engagement with the tubular housing. In this way, the housing is locked against rotatable movement relative to its vehicle mount. Further, the housing is locked against longitudinal movement in either direction. To free the tubular housing for rotatable or longitudinal movement, the hand wheel is backed off the threads, toward the right in Figure 3.

At its outer end, the tubular housing 14 is extended into a sleeve 52 located exteriorly of the vehicle. Sleeve 52 is pinned or keyed as at 54 to the tubular housing, against movement relative to the housing. At its outer end, sleeve 52 is integrally formed with a cup-like turret base 56, against the open end of which is engaged the periphery of a cup-shaped turret 58. An annular sealing ring 60, of neoprene rubber or the like, is engaged between the turret base and turret, seating in opposite circumferential recesses of the base and turret.

In the turret 58 there is formed an axial bore 62, and as shown in Figure 2, a hollow shaft 64 is rotatably engaged in the bore. A bushing 66 is extended within the hollow shaft, and extending through the bushing is a headed pin 68 on one end of which a nut 70 is threaded, the headed pin extending through a smooth walled opening 71 formed in the turret base 56.

In this way, the turret base and turret are held in assembled position, and by taking up the nut to a selected extent, the seal ring can be compressed. At the same time, however, the turret is rotatable relative to the turret base, in a manner to be presently made apparent.

A short, tapered support arm 72 has a reduced, threaded stud 74 at its base (Figure 2) threaded in a complementarily threaded side opening formed in the turret housing. At its other end, arm 72 is integrally formed with a spherical portion 76, engaged frictionally in a socket portion 78, having a peripheral, outwardly extended flange riveted at 80 to a back plate 82 of a mirror element 84.

Located diametrically opposite the mirror element upon the turret is a counterweight or balance 86 of cylindrical, solid formation, having a reduced, threaded stud 88 coaxial with stud 74 and threaded into a complementarily threaded opening formed in the turret housing at a location diametrically opposite the opening receiving the stud 74. On the outer end of the counterweight 86 there can be provided a prismatic reflector element or "cat's-eye" 87.

A bevel gear 90 is sleeved upon the shaft 64, and while slidable axially of shaft 64, is rotatable with the shaft through the provision of a suitable key, spline rib, or the like. Further, the shaft 64 is adapted to be made rotatable with the turret 58, though the turret can shift longitudinally of the shaft 64. A coil spring 92, circumposed about hollow shaft 64, is held under compression between the turret 58 and gear 90, and continuously and yieldably biases gear 90 into mesh with a beveled gear 94 having a cylindrical base 96 fixedly secured within the outer end of a hollow shaft 98 rotatably mounted within and extending the full length of the tubular housing 14.

The end of the tubular housing 14 disposed within the vehicle extends into a sleeve 100 pinned at 102 to housing 14. Sleeve 100 is integral with a cupped control knob base 104, having at its open end a circumferential, inwardly facing recess opposing a circumferential, outwardly facing recess formed in the control knob, a compressible seal ring 106 being interposed between the control knob base 104 and the control knob 108, in said recesses. The control knob 108 is exteriorly fluted or otherwise adapted to be gripped by one desiring to rotate the same, and is formed with an axial bore 110 the outer end of which opens into a flared recess 112 and the inner end of which opens into a counterbore 114. A bushing 116 (Figure 4) extends within the axial bore 110, and extending within bushing 116 is an inner bushing 118. A headed pin or connecting bolt 120 extends within the inner bushing, and is provided with a nut 122 within the flared recess 112. The bolt connects the control knob and its associated base, compressing the seal ring while still permitting rotation of the control knob relative to said base. At its head end, the pin 120 extends within a bore 124 formed in the base 104.

The bushing 116 is keyed to the control knob for rotation thereby, and slidable upon and rotatable with said bushing 116 is a gear 126. A coil spring 128 is held under compression between the gear 126 and the base of the counterbore 114, and continuously urges the gear 126 into mesh with a gear 130 fast to the inner end of the hollow shaft 98.

Whenever it is desired to lock the shaft 98 in a selected position to which it has been rotated, a set screw 132 is threaded thereagainst through a threaded opening formed in the sleeve 100 (Figure 3), said set screw being provided with a handle 134 to facilitate rotation thereof.

In use of the device, and assuming that one desires to adjust the position of the mirror element, with set screw 132 loosened, the control knob 108 is rotated in a selected direction. Through the medium of the gears 126, 130, shaft 98, gears 94 and 90 and shaft 64, turret 58 will be rotated about the axis of pin 68, thus shifting mirror element 84 through a circular path about said axis.

Assuming that it is desired to adjust the mirror element not only through an arcuate path in a lateral direction in the manner referred to above, but also upwardly or downwardly, one need only, with the wheel 48 loosened, grasp knob 108 and swing the same upwardly or downwardly through an arcuate path about the axis of the tubular housing 14, with the set screw 132 in locking position. This bodily rotates housing 114, transmitting corresponding rotatable movement to the turret base 56 and the turret, the turret now swinging in an arcuate path about the axis of the tubular housing 14, that is, about an axis perpendicular to the axis of the pin 68 about which the turret was previously rotated. This swings the mirror element 84 upwardly or downwardly to a selected position.

If it is desired to adjust the mirror element inboard or outboard of the vehicle, with the wheel 48 loose, the control knob assembly is grasped, and bodily shifted to right or left in Figure 3, depending on whether the mirror assembly is to be adjusted inwardly or outwardly of the vehicle. This adjusts the entire mirror assembly toward or away from the vehicle wall, as shown by comparison of the full and dash-dotted positions shown in Figure 1.

It is important to note that in all positions of adjustment of the device, whether the mirror element be swung upwardly, downwardly, side to side, and/or inboard or outboard of the vehicle, all parts can be locked in a selected, adjusted position by tightening of the set screw 132 and locking knob 48, with the adjustable setting and locking of the parts all being achieved within the cab of the truck.

It is also of importance that the construction is such as to facilitate the adjustable positioning of the mirror elements within a wide range of positions, thus to facilitate not only the checking of traffic, but also inspection of tires, etc. Further, the reflected image seen in the mirror element is not distorted, since the suction means provided by the seal rings 60, 106, and by the rubber discs 18, 20 cooperates with the counterbalanced mirror mounting to afford a properly counterweighted, flexible support for the mirror element, particularly adapted to minimize distortions of the type referred to.

Still further, the construction illustrated and described is such as to facilitate the mounting of the device on vehicles of various makes, designs, or widths, without modification of redesign of the vehicle, it being merely necessary to form an opening through which the housing 14 is extendable, after which the device can be readily assembled upon the vehicle, ready for use.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A rear view mirror for vehicles comprising: a tubular housing adapted to be mounted upon a vehicle for rotation about a first axis; a shaft extending within and rotatable about said axis relative to said housing; means at one end of the housing for rotating the shaft relative to the housing; a cup-shaped turret base connected to the housing for rotation therewith about said axis; a turret cupped oppositely to the turret base and rotatably supported at its periphery upon the periphery of the turret base, for rotation about a second axis normal to that of the housing; a pin extending centrally through both the base and turret, said pin constituting the second axis and holding the turret and base assembled with one another for joint rotation about the first axis with the housing; a sleeve extending about and rotatable on the pin about said second axis; a first beveled gear within the turret base connected to the shaft for rotation therewith; a second beveled gear mounted upon the sleeve for sliding movement axially of and for rotation with the sleeve, said second gear meshing with the first gear, the turret being mounted on the sleeve for sliding movement axially of and for rotation with the sleeve; a coiled compression spring bearing at its opposite ends against the turret and the second gear respectively and biasing the second gear into mesh with the first gear; and a mirror element connected to the turret for rotation therewith about each of said first and second axes.

2. A rear view mirror for vehicles comprising a tubular housing adapted to be mounted upon a vehicle for rotation about a first axis; a shaft extending within and rotatable about said axis relative to the housing; means at one end of the housing for rotating the shaft relative to the housing; a cup-shaped turret base connected to the housing for rotation therewith about said axis; an annular, compressible gasket supported upon the periphery of the turret base; a turret cupped oppositely to the turret base and engaged at its periphery with the gasket, said turret being rotatable upon the turret base about a second axis normal to that of the housing; a pin extending centrally through both the base and turret, said pin constituting the second axis and holding the turret and base assembled with one another for joint rotation about the first axis with the housing; a nut threaded upon the pin exteriorly of the turret base and turret and cooperating with the pin in holding the turret base and turret assembled, said nut when threaded in one direction drawing the turret and turret base toward one another axially of the pin to compress the gasket; a sleeve extending about and rotating upon the pin about said second axis; a first beveled gear within the turret base connected to the shaft for rotation therewith; a second beveled gear mounted upon the sleeve for sliding movement axially of and for rotation with the sleeve, said second gear meshing with the first gear, the turret being mounted on the sleeve for sliding movement axially of and for rotation with the sleeve; a coiled compression spring bearing at its opposite ends against the turret and the second gear respectively and biasing the second gear into mesh with the first gear; and a mirror element connected to the turret for rotation therewith about each of said first and second axes.

References Cited in the file of this patent

UNITED STATES PATENTS

| | | |
|---|---|---|
| 2,191,049 | Tornblom | Feb. 20, 1940 |
| 2,260,597 | Beattie | Oct. 28, 1941 |
| 2,281,234 | Clark et al. | Apr. 28, 1942 |
| 2,315,260 | Lancaster | Mar. 30, 1943 |
| 2,540,257 | Gross | Feb. 6, 1951 |
| 2,570,536 | Fellabaum | Oct. 9, 1951 |
| 2,585,308 | Goldstein | Feb. 12, 1952 |
| 2,674,922 | Robinson | Apr. 13, 1954 |